United States Patent [19]

Nomura et al.

[11] Patent Number: 5,799,502

[45] Date of Patent: Sep. 1, 1998

[54] ABSORPTION TYPE REFRIGERATING APPARATUS

[75] Inventors: Kazuo Nomura; Tomohiko Kato; Tomonori Tamura; Shigeru Murayama, all of Ohra-gun, Japan

[73] Assignee: Sanyo Electric Co., Ltd., Osaka-fu, Japan

[21] Appl. No.: 688,711

[22] Filed: Jul. 31, 1996

[30] Foreign Application Priority Data

Aug. 1, 1995 [JP] Japan ................. 7-216755
Aug. 1, 1995 [JP] Japan ................. 7-216756

[51] Int. Cl.$^6$ .................. F25B 37/00; F25B 15/02
[52] U.S. Cl. ........................... 62/476; 62/485
[58] Field of Search ................... 62/476, 485, 101, 62/484

[56] References Cited

U.S. PATENT DOCUMENTS

| | | | |
|---|---|---|---|
| 2,287,441 | 6/1942 | McGinnis | 62/5 |
| 2,301,232 | 11/1942 | Thomas et al. | 62/119 |
| 4,127,009 | 11/1978 | Phillips | 62/101 |
| 4,127,010 | 11/1978 | Phillips | 62/101 |
| 4,368,624 | 1/1983 | Takeshita | 62/238.3 |
| 4,383,416 | 5/1983 | Phillips | 62/101 |
| 4,411,140 | 10/1983 | Katsumata et al. | 62/324 |
| 4,534,175 | 8/1985 | Kogan et al. | 60/649 |
| 4,718,237 | 1/1988 | Sterlini | 60/673 |
| 4,719,767 | 1/1988 | Reid, Jr. et al. | 62/476 |
| 5,111,670 | 5/1992 | Furukawa et al. | 62/475 |
| 5,157,942 | 10/1992 | Dao | 62/476 |
| 5,339,654 | 8/1994 | Cook et al. | 62/476 |

FOREIGN PATENT DOCUMENTS

| | | |
|---|---|---|
| 827956 | 7/1949 | Germany. |
| 5-272831 | 10/1993 | Japan. |

Primary Examiner—William Doerrler
Attorney, Agent, or Firm—Weingarten, Schurgin Gagnebin & Hayes LLP

[57] ABSTRACT

An absorption type refrigerating apparatus which has a high performance coefficient as an entire apparatus by improving the cooling capacities of the condensation function portion and the absorption function portion and can be reduced in size is constituted such that the cooling function portion 1 for cooling the absorption function portion (absorber) 1 by means of the first heat operation fluid (cooling water) 35a is divided into a plurality of sub-portions such as the cooling pipe 201A, cooling pipe 201H and absorption/heat exchanger 234, the flow passages of the first heat operation fluid 35a are connected to these cooling function sub-portions 201A, 201H and 234 in parallel/series like a route formed by the pipe lines 20, 20A, 20D and 21 and a route formed by the pipe lines 20, 20B, 20C and 21, and the cooling capacity of the cooling pipe 201H is increased by forming a continuous irregular surface 1C on the inner wall of the outer shell 1A of the absorber 1. The above apparatus may be modified such that the cooling pipe 201H is provided inside the absorber 1 and a cooling pipe is replaced for the absorption/heat exchanger 234 and installed inside the absorber 1.

3 Claims, 12 Drawing Sheets

Enlarged View Of Portion A

Section Of Air-Cooled Heat Exchanger

| Detected Signals → | 70 | 80 |
| Controlling Signals ← | | |

5,799,502

1

ABSORPTION TYPE REFRIGERATING APPARATUS

BACKGROUND OF THE INVENTION

1. Field of the Invention

This invention relates to an absorption type refrigerating machine (to be referred to as "absorption type refrigerating apparatus" in the present invention) such as an absorption refrigerating machine or absorption water cooler/heater in which desired heat exchange operation is performed by an absorption heat pump function which uses an absorption solution mixed with a refrigerant to cool or heat a target heat operation fluid.

2. Background Art

As this type of apparatus, an absorption type refrigerating apparatus which uses a fluid having a relatively low evaporation temperature such as $NH_3$, i.e., ammonia, as a refrigerant and an inexpensive, harmless fluid having a relatively high evaporation temperature compared with this refrigerant, such as a water mixture, as an absorption solution has been conventionally known.

Another conventionally known absorption type refrigerating apparatus has such constitution that a function to provide a function to carry out desired heat exchange, i.e., generator-absorber heat exchanging function (generator-absorber heat exchanger), is provided between a generator for evaporating the above refrigerant by heating the above absorption solution and an absorber for causing the above refrigerant to be absorbed into the above water to enhance heat operation efficiency. This generator-absorber heat exchanging function is called "GAX function".

The operation and effect of this GAX function is disclosed, e.g., in FIG. 2 of the Generator-Absorber Heat Exchanger Unit (to be referred to as "first prior art" hereinafter) on page 98 of ASME, AES, Vol. 8, 1988 in which the GAX function is performed by a pipe line connecting a pipe line provided in the absorber and a pipe line provided in the absorber in the configuration of numeral 8.

Further, the concrete constitution of an absorption type refrigerating apparatus having such a GAX function, that is, constitution as shown in FIG. 12 (to be referred to as "second prior art" hereinafter), is disclosed in JP-A Hei 6-323676 (the term "JP-A" as used herein means an "unexamined published Japanese patent application") applied by the Applicant of the present invention.

In the constitution of FIG. 12, the circulation system of an absorption solution is explained with a diluted solution 2b having a low concentration of a refrigerant accumulated in the bottom of a generator 5 as a starting point. The diluted solution 2b passes through a heat exchange pipe 205A, an absorption solution heat exchanger 31 and a pressure reducing unit 9 due to the difference between pressure inside the generator 5 and pressure inside the absorber 1, is sprayed through a spray pipe 201D, absorbs refrigerant vapor 7c to become a concentrated solution 2a while it is dropping along a heat exchange pipe 201X, a heat exchange pipe 201B and a cooling pipe 201A, and accumulates in the bottom of the absorber 1.

The concentrated solution 2a circulates in the following way, applied pressure by a pump 3. It passes through the heat exchange pipe 201B, a heat exchange pipe 205D, an absorption solution heat exchanger 31 and the heat exchange pipe 201X. During this period, the concentrated solution 2a absorbs heat generated when the diluted solution 2c sprayed through the spray pipe 201D absorbs refrigerant vapor 7c and then heat of the refrigerant vapor 7a in the heat exchange pipe 205D. Thereafter, the concentrated solution 2a is preheated as it passes through the heated side of the absorption solution heat exchanger 31, heated again in the heat exchange pipe 201X by absorbing heat generated when the sprayed diluted solution 2c absorbs the refrigerant vapor 7c, sprayed from a spray pipe 205C, evaporates the refrigerant vapor 7a while it is dropping along the heat exchange pipes 205A, and accumulates in the bottom of the generator 5 as a diluted solution 2b.

Therefore, the heat exchange pipe 201B and the heat exchange pipe 201X constitute the GAX function portion which utilizes heat present on the side of the absorber 1 to aid heating required for the generation of refrigerant vapor in the generator 5.

A description is subsequently given of the refrigerant circulation system with refrigerant vapor 7a in the generator 5 as a starting point. The refrigerant vapor 7a is circulated as follows. Since the refrigerant vapor 7a generated by heating the diluted solution 2b by a heater 6 contains a large amount of a water vapor component, it not only increases the concentration of the refrigerant contained in the refrigerant vapor 7a, i.e., the concentration of $NH_3$, owing to a gas-liquid contact function, i.e., heat exchange, separation and absorption functions generated when the refrigerant vapor is contacted to the surface of the absorption solution, but also performs a rectifying function by which excess heat is absorbed by the heat exchanger 205D. Further, it performs a fractional distillation function to gradually increase the concentration of the refrigerant contained in the refrigerant vapor 7a by the gas-liquid contact function between the refrigerant vapor 7a and a highly concentrated absorption solution obtained by condensing part of the refrigerant vapor 7a, i.e., a portion of the refrigerant vapor in contact with the heat exchange pipe by absorbing heat by the heat exchange pipe 205E, is supplied into the absorber 1 through a condenser 11, a pressure reducing unit 13 and an evaporator 14, absorbed into the diluted solution 2a sprayed from the spray pipe 201D to become a concentrated solution 2a, joins the above absorption solution circulation system, is sprayed into the generator 5 from the spray pipe 205C, and heated by the heater 6 to become the refrigerant vapor 7a.

In this instance, the refrigerant vapor 7a entering the condenser 11 through the pipe line 10 discharges heat by giving heat to a first heat operation fluid 35a which passes through a heated side 11A, e.g., water, condenses into a refrigerant solution 7b which then passes through a pipe line 12 and enters the pressure reducing unit 13. Each of the pressure reducing units 9 and 13 is formed of a pressure reducing valve, e.g.

The refrigerant solution 7b whose pressure has been reduced by the pressure reducing unit 13 enters the evaporator 14, absorbs heat from a second heat operation fluid 35b passing through the cooled side 14A of the evaporator 14, e.g., water, to evaporate and become refrigerant vapor 7c which then passes through the pipe line 15 and returns to the absorber 1. Taking the above course, the refrigerant solution 7b provides required heat operation to the first heat operation fluid 35a passing through the pipe lines 20, 21, 22 and 23 and the second heat operation fluid 35b passing through the pipe lines 24 and 25.

A description is subsequently give of the circulation systems of the first heat operation fluid 35a and the second heat operation fluid 35b which are circulated by an outdoor heat exchanger 61 and an indoor heat exchanger 62 arranged at an upper portion of the apparatus and connected to the pipe lines 20, 21, 22, 23, 24 and 25. The connection path between the outdoor heat exchanger 61 and the indoor heat exchanger 62 can be changed by a pipe line connection switch 63, a pump 64 is a pump for promoting the circulation of the first heat operation fluid 35a passing through the heated side 11A of the condenser 11, e.g., water, and a pump 65 is a pump for promoting the circulation of the second heat operation fluid 35b passing through the cooled side 14A of the evaporator 14, e.g., water.

A heat operation fluid to be heated or cooled, e.g., water for heating or cooling, and a fluid for absorbing or discharging heat, e.g., water for absorbing or discharging heat by passing through a radiator with a fin are provided to the pipe lines 20 and 21 for supplying the first heat operation fluid 35a to the cooling pipe 201A of the absorber 1, the pipe lines 22 and 23 for supplying the first heat operation fluid 35a to the heated side 11A of the condenser 11 and the pipe lines 24 and 25 for supplying the second heat operation fluid 35b to the cooled side 14A of the evaporator 14.

The pipe line connection switch 63 is a switch valve for switching between connection paths shown by solid lines and connection paths shown by dotted lines for eight pipe lines in the figure. Since it switches among eight pipe lines, it is also called "eight-way valve". It performs switching operation by operating a switch axis by means of an electric actuator which becomes operative in response to a control signal from a controller (to be referred to as "CPU" hereinafter) formed of a microcomputer.

A circulation system for cooling operation by means of heat operation fluids is constructed by forming the following paths according to switch connections for paths shown by solid lines: (1) a heat discharge path in which heat discharge operation is performed by forcedly giving outdoor air to the heat discharge side 61A of the outdoor heat exchanger 61 by means of a fan 61B while the first heat operation fluid 35a is circulated in a circulation path from the pipe line 20, cooling pipe 201A, pipe line 21, pipe line 22, heated side 11A of the condenser 11, pipe line 23, pipe line connection switch 63, outdoor heat exchanger 61, pipe line connection switch 63 and pump 64 back to the pipe line 20 and (2) a cooling heat absorption path in which indoor air cooling operation is performed by forcedly providing indoor air by means of a fan 62B for circulation to the cooled side 62A of the indoor heat exchanger 62 while the second heat operation fluid 35b is circulated in a circulation path from the pipe line 24, the cooled side 14A of the evaporator 14, pipe line 25, pipe line connection switch 63, indoor heat exchanger 62, pipe line connection switch 63 and pump 65 back to the pipe line 24.

A circulation system for heating operation by means of heat operation fluids is constructed by forming the following paths according to switch connections for paths shown by dotted lines: (1) a heat discharge path in which indoor air is heated by forcedly providing indoor air to the heated side 62A of the indoor heat exchanger 62 while the first heat operation fluid 35a is circulated in a circulation path from the pipe line 20, cooling pipe 201A, pipe line 21, pipe line 22, heated side 11A of the condenser 11, pipe line connection switch 63, indoor heat exchanger 62, pipe line connection switch 63 and pump 64 back to the pipe line 20 and (2) a heat absorption path in which heat absorption operation is performed by forcedly providing outdoor air by means of a fan 61B to the heat absorption side 61A of the indoor heat exchanger 61 while the second heat operation fluid 35b is circulated in a circulation path from the pipe line 24, the cooled side 14A of the evaporator 14, pipe line 25, pipe line connection switch 63, indoor heat exchanger 61, pipe line connection switch 63 and pump 65 back to the pipe line 24.

The control of the cooling or heating operation of the heat operation fluids is carried out by a control signal from each part of the CPU 70. This control is performed by controlling the operations of the heater 6, the pipe line connection switch 63 and the pumps 3, 64 and 65, etc. in response to control signals which are obtained by supplying to the CPU 70 detection signals obtained by detecting the operation states of required parts, e.g., temperature, and a setting signal from a setting operation unit 80 for setting operation conditions and carrying out required control processings at the CPU 70.

In the constitution of the second prior art as described above, to remove frost produced in the outdoor heat exchanger 61 at the time of heating operation, defrosting operation for defrosting the outdoor heat exchanger 61 needs to be carried out, by which the outdoor heat exchanger is temporarily made in a cooling operation state. During this defrosting operation and after the completion of the defrosting operation, there occurs such inconvenience that the indoor heat exchanger 62 temporarily discharges cool air.

To eliminate such inconvenience, JP-A Hei 6-94322 which has been applied by the Applicant of the present invention discloses such constitution (to be referred to as "third prior art" hereinafter) that opening/closing valves V1 and V2 between the flow passages of the first heat operation fluid 35a and the second heat operation fluid 35b are opened to join the first heat operation fluid 35a and the second heat operation fluid 35b, and an opening/closing valve V3 between the flow passage of the refrigerant vapor 7a from the generator 5 and the flow passage of the refrigerant vapor 7c entering the absorber 1 is opened to directly supply the high-temperature refrigerant vapor 7a into the absorber 1.

Further, JP-A Hei 6-323676 discloses such constitution (to be referred to as "fourth prior art" hereinafter) that the concentrated solution 2a is directly provided to the pressure reducing unit 9 from the heat exchanger 205A without providing the absorber solution heat exchanger 31 because there are no troubles such as the diluted solution 2b is not scattered at the exit of the spray pipe 201D and a temperature reduction is caused by scattering in the constitution of the above second prior art in which heat exchange operation can be sufficiently performed by the heat exchanger 205.

JP-A Hei 5-272831 discloses such constitution (to be referred to as "fifth prior art" hereinafter) that the pipe line connection switch 63 in the constitution of the second prior art as described above is divided into the pipe line connection switch 63A and the pipe line connection switch 63B separately, each formed of a four-way valve as shown in FIG. 13.

That is, in FIG. 13, portions represented by the same reference symbols as those in FIG. 12 have the same functions as portions having the same reference symbols in FIG. 12. The pipe line connection switch 63A and the pipe line connection switch 63B can be switched simultaneously. Connection paths shown by solid lines and connection paths shown by dotted lines in the pipe line connection switch 63 of FIG. 12 correspond to connection paths shown by solid lines and connection paths shown by dotted lines in the pipe line connection switch 63A and the pipe line connection switch 63B, respectively. Since the pipe line connection switch 63A and the pipe line connection switch 63B are a switching valve for switching among four pipe lines, they are called "four-way valve".

In the constitution of the above second prior art, since the cooling path of the first heat operation fluid 35a with respect to the cooling pipe 201A of the absorber 1 and the condenser 11, i.e., cooling water, is formed as a serial path in which the cooling pipe 201A of the absorber 1 comes before the condenser 11, when the cooling amount is large in the cooling stage of the cooling pipe 201A of the absorber 1, the cooling amount becomes small in the cooling stage of the condenser 11. As a result, there occurs such inconvenience that a satisfactory condensing effect cannot be obtained from the condenser 11 and the performance coefficient of the entire system is reduced.

Conversely, when the cooling amount is large at the condenser 11 and condensation pressure is reduced, the cooling amount in the cooling pipe 201A of the absorber 1 is reduced. As a result, there occurs such inconvenience that the performance coefficient of the entire system is reduced.

To eliminate the above inconvenience, two constitutions are conceivable: one in which the flow rate of the first heat operation fluid 35a is increased so that the first heat operation fluid 35a which has performed desired cooling operation at the condenser 11 and has still enough cooling capability is supplied to the cooling pipe 201A and one in which the flow passage of the first heat operation fluid 35a circulating in the cooling pipe 201A of the absorber 1 and the flow passage of the first heat operation fluid 35a circulating in the condenser 11 are arranged in parallel.

However, in all of these constitutions, since the size of the cooling pipe 201A must be increased in order to cool the absorber 1 by the cooling pipe 201A sufficiently, the diameter of a coil of the coiled cooling pipe 201A or the length of the cooling pipe 201A must be sufficiently increased. Therefore, the absorber 1 becomes bulky and there occurs such inconvenience that a small-sized apparatus cannot be provided.

Further, in the constitutions of the second prior art and the fifth prior art, the flow passage of the first heat operation fluid 35a, i.e., cooling water, and the flow passage of the second heat operation fluid, i.e., cold/hot water used for air-conditioning are switched by an eight-way valve or two two-way valves. Therefore, since heat exchange is performed between the heat operation fluids through the valve chests or valve bodies of these switching valves, a heat loss is produced and there is such inconvenience that the performance coefficient of the entire system cannot be improved sufficiently.

Since the pipe line of the first heat operation fluid 35a, i.e., cooling water, must be increased in diameter to achieve a cooling effect as described above and accordingly, an eight-way valve or four-way valve for switching the flow passage of cooling water becomes large in size, the apparatus cannot be made small in size. In addition, since the valve switching unit of the eight-way valve or four-way valve is generally driven by a motor, quick switching operation cannot be performed due to movement inertia and switching operation is slow during defrosting operation. Therefore, there is such inconvenience that an unpleasant feeling is given to a human body.

Moreover, since the capacity of cooling water must be increased from a view point of efficiency at the time of cooling operation, the heat capacity of cooling water is inevitably large. Therefore, the capacity of cooling water becomes large and a start-up time for heating operation is prolonged. In addition, defrosting operation for defrosting the outdoor heat exchanger 61 must be performed sometimes at the time of heating operation, a start-up time for heating operation after this defrosting operation is prolonged. Therefore, there is inconvenience that an unpleasant feeling is given to a human body.

Therefore, an absorption type refrigerating apparatus which is free from the above inconveniences has been desired.

SUMMARY OF THE INVENTION

In order to solve the above-mentioned problems, the present invention provide the apparatus having constitutions as follows:

(1) first constitution that, in an absorption type refrigerating apparatus for obtaining a heat source for cooling or heating a desired heat operation object by means of a second heat operation fluid for heat exchanging with an evaporation function portion while cooling an absorption function portion and a condensation function portion by means of a first heat operation fluid by providing an absorption solution circulation system for circulating absorption solutions through the absorption function portion for causing refrigerant vapor to be absorbed into an absorption solution and a refrigerant circulation system for circulating a refrigerant through a generation function portion for generating the refrigerant vapor from the absorption solution, the condensation function portion for obtaining a condensed refrigerant by condensing the generated refrigerant vapor, and the evaporation function portion for obtaining the refrigerant vapor by evaporating this condensed refrigerant, there are provided a plurality of absorption function means for dividing a cooling function portion for cooling the above absorption function portion by means of the above first heat operation fluid into a plurality of cooling function sub-portions; and cooling flow passage means for connecting the flow passages of the above first heat operation fluid to the plurality of cooling function sub-portions;

(2) second constitution that, in the above absorption type refrigerating apparatus, there are provided:

a plurality of absorption function means for dividing a cooling function portion for cooling the above absorption function portion by means of the above first heat operation fluid into a plurality of cooling function sub-portions; and cooling flow passage means for connecting the flow passages of the above first heat operation fluid to the plurality of cooling function sub-portions in parallel;

(3) third constitution that, in the above absorption type refrigerating apparatus, there are provided:

a plurality of absorption function means for dividing a cooling function portion for cooling the above absorption function portion by means of the above first heat operation fluid into a plurality of cooling function sub-portions arranged inside the above absorption function portion; and cooling flow passage means for connecting the flow passages of the above first heat operation fluid to the plurality of cooling function sub-portions in parallel;

(4) fourth constitution that, in the above absorption type refrigerating apparatus, there are provided:

a plurality of absorption function means for dividing a cooling function portion for cooling the above absorption function portion by means of the above first heat operation fluid into a cooling function sub-portion arranged inside the above absorption function portion and a cooling function sub-portion arranged outside the above absorption function portion; and cooling flow passage means for connecting the flow passages of the above first heat operation fluid to the above cooling function sub-portion arranged inside and the above cooling function sub-portion arranged outside in series;

(5) fifth constitution that, in the above absorption type refrigerating apparatus, there are provided:

a plurality of absorption function means for dividing a cooling function portion for cooling the above absorption function portion by means of the above first heat operation fluid into a plurality of cooling function sub-portions arranged inside the above absorption function portion and a cooling function sub-portion arranged outside the above absorption function portion; and cooling flow passage means for connecting the flow passages of the above first heat operation fluid to the above cooling function sub-portions arranged inside in parallel and connecting the flow passage of the heat operation fluid to the above cooling function sub-portion arranged outside in series;

(6) sixth constitution that, in the above absorption type refrigerating apparatus, there are provided:

a plurality of absorption function means for dividing a cooling function portion for cooling the above absorption function portion by means of the above first heat operation fluid into a cooling function sub-portion arranged inside the above absorption function portion and a plurality of cooling function sub-portions arranged outside the above absorption function portion; and cooling flow passage means for connecting the flow passages of the above first heat operation fluid to the above cooling function sub-portion arranged inside and one of the above cooling function sub-portions arranged outside in parallel and connecting the flow passage of the heat operation fluid to the other cooling function sub-portion arranged outside in series;

(7) seventh constitution that, in an absorption type refrigerating apparatus for obtaining a heat source for cooling or heating a desired heat operation object by means of a second heat operation fluid for heat exchanging with a refrigerant circulation system while cooling the absorption heat of an absorption function portion by means of a first heat operation fluid by providing an absorption solution circulation system for circulating absorption solutions through the absorption function portion for causing refrigerant vapor to be absorbed into an absorption solution and the refrigerant circulation system for circulating a refrigerant through a generation function portion for generating refrigerant vapor from the absorption solution, a condensation function portion for obtaining condensed refrigerant by condensing the generated refrigerant vapor and an evaporation function portion for obtaining refrigerant vapor by evaporating this condensed refrigerant, there are provided:

refrigerant path switching means for switching between cooling and heating operations to be carried out by the second heat operation fluid by reversing the path of the refrigerant circulation system with respect to a heat exchange function portion for heat exchanging; and heat operation fluid joining means for joining the flow passage of the above first heat operation fluid and the flow passage of the above second heat operation fluid during heating operation and intercepting joining during cooling operation;

(8) eighth constitution that, in addition to the seventh constitution, there is provided:

heating operation starting means for providing high-temperature refrigerant vapor in the above generation function portion to the above heat exchange function portion at each beginning of the start of heating operation;

(9) ninth constitution that, in addition to the seventh constitution, there are provided:

outside air heat exchanging means for providing a first outside air heat exchange function portion for heat exchanging the above refrigerant vapor with the outside air in the circulation path of the above refrigerant vapor and a second outside air heat exchange function portion for heat exchanging the above absorption solution with the outside air in the circulation path of the above absorption solution; and heating time operation means for stopping or reducing the heat exchange function of the above second outside air heat exchange function portion during heating operation;

(10) tenth constitution that, there is provided:

in place of the heating time operation means in the above ninth constitution, inclusive heat exchanging means for arranging part of the above first outside air heat exchange function portion in a high-temperature portion of the second outside air heat exchange function portion; and

(11) eleventh constitution that there are provided:

in place of the heat operation fluid joining means in the above seventh constitution, refrigerant-outside air heat exchanging means for providing a heat exchange function portion for heat exchanging the above refrigerant vapor with the outside air in the circulation path of the above refrigerant vapor; and flow passage switching means for providing a heat exchange function portion for heat exchanging the above first heat operation fluid with the outside air and for separating and circulating the first heat operation fluid and the second heat operation fluid during cooling operation and joining the above first heat operation fluid and the above second heat operation fluid during heating operation.

These and other objects and advantages of the present invention will become clear from the following description with reference to the accompanying drawings.

BRIEF DESCRIPTION OF THE DRAWINGS

Out of the accompanying drawings, FIGS. 1 to 11 show the embodiments of the present invention and FIGS. 12 and 13 show the prior art, of which:

FIG. 1 is a block diagram of key portions of an absorption type refrigerating apparatus;

FIG. 2 is a block diagram of key portions including a GAX function and additional cooling pipe;

FIG. 3 is a block diagram of key portions including an additional cooling pipe;

FIG. 5 is a structural diagram of the pipe lines of key portions;

FIG. 6 is a structural diagram of the pipe lines of key portions including an additional cooling pipe;

FIG. 7 is a structural diagram of the pipe lines of key portions including an alternate additional cooling pipe;

FIG. 8 is a block diagram of key portions including a heat exchange pipe;

FIG. 9 is a block diagram of key portions where the absorption solution heat exchanger is removed;

FIG. 10 is a side view of key portions of FIG. 9;

FIG. 11 is a block diagram of key portion including an air cooled heat exchanger;

FIG. 12 is a block diagram of an entire absorption type refrigerating apparatus illustrating the FAX function; and FIG. 13 is a prior art block diagram of key portions.

DETAILED DESCRIPTION OF THE PREFERRED EMBODIMENTS

The present invention will be described in detail with reference to the following embodiments in which the constitutions of the present invention are applied to modifications of the constitutions of the prior arts shown in FIG. 12.

With reference to FIGS. 1 to 11, the preferred embodiments of the present invention will be described. In FIGS. 1 to 11, portions denoted at the same reference symbols as those in FIGS. 12 and 13 have the same functions as portions having the same reference symbols in FIGS. 12 and 13. In FIGS. 1 to 11, portions denoted at the same reference symbols have the same functions as portions having the same reference symbols in any one of FIGS. 1 to 11. In these figures, the outdoor heat exchanger 61, indoor heat exchanger 62, pipe line connection switch 63, CPU 70 and setting operation unit 80 are not shown and each fluid flows in a direction shown by arrows.

[Embodiment 1]

Figure 1:
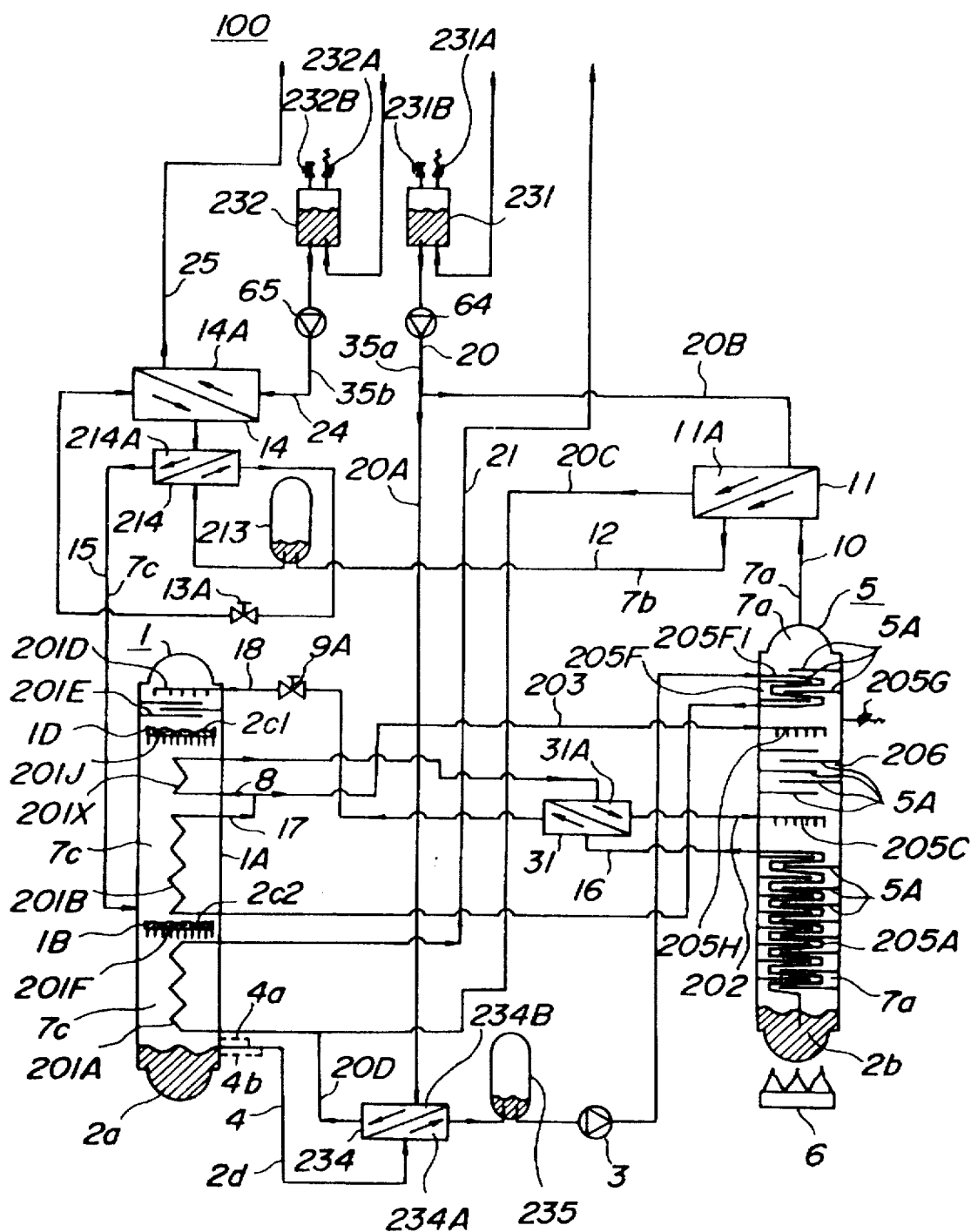
Figure 5:
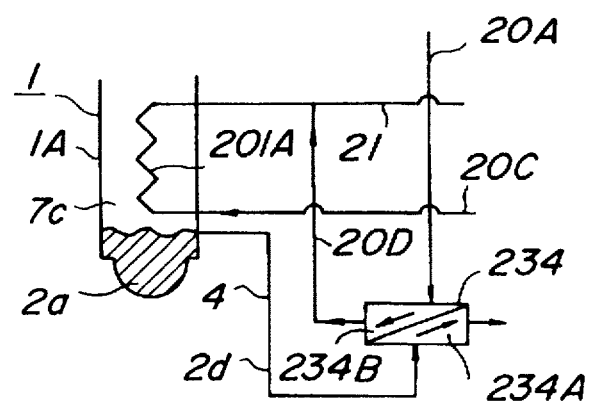

With reference to FIGS. 1 and 5, Embodiment 1 of the present invention will be described hereinunder. The differences between the constitution of FIG. 1 and the constitution of FIG. 12 are as follows.

In the generator 5, firstly, most of the inner portion is partitioned by spiral shelves 5A arranged spirally on the inner wall of the outer shell and the heat exchanger 205A is coiled and arranged between adjacent spiral shelves 5A so that heat exchange between the refrigerant vapor 7a and the diluted solution 2b in the heat exchanger 205A can be improved. Secondly, a rectifying portion 206 rectifies making use of a passage formed by the spiral shelves 5A. Thirdly, at the uppermost portion of the generator 5, a reflux portion 205F is formed of a pipe line which is coiled such that the heat exchange pipe 205F1 can follow the spiral shelves 5A.

The heat exchange pipe 205F1 of the reflux portion 205F performs fractional distillation operation for condensing part of the refrigerant vapor 7a by means of a relatively low-temperature concentrated solution 2a by causing heat exchange to be performed between the concentrated solution 2a from the bottom of the absorber 1 passing through the inside of the heat exchanger 205F1 and the refrigerant vapor 7a, so as to rectify the refrigerant vapor 7a. i.e., increase the concentration of the refrigerant contained in the refrigerant vapor 7a.

Fourthly, a safety valve 205G is provided to maintain safety by discharging the refrigerant vapor to the outside when the pressure of the refrigerant vapor 7a inside the generator 5 rises to a level beyond safety.

In a portion where the refrigerant vapor 7c from the evaporator 14 is caused to flow into the absorber 1, firstly, a storage tank 213 for storing the condensed refrigerant 7b and a heat exchanger 214 for precooling are provided along the pipe line 12 so that the refrigerant solution 7b is caused to flow into the evaporator 14 after it is a little cooled. Secondly, an expansion valve 13A is provided between the heat exchanger 214 for precooling and the evaporator 14 in place of the pressure reducing unit 13.

Further, safety valves 231A and 232A for maintaining safety by discharging abnormal vapor or abnormal pressure when they occur and opening/closing valves 231B and 232B for supplying heat operation fluids 35a and 35b are provided in the flow passage of the first heat operation, fluid 35a and the flow passage of the second heat operation fluid 35b, respectively.

In the absorption solution heat exchanger 31, heat exchange pipe 201B, heat exchange pipe 201X and heat exchange pipe 205F1, firstly, the concentrated solution 2a supplied from the pump 3 is circulated by a route from the upper end side of the heat exchange pipe 205F1 of the reflux portion 205F, the lower end side of the heat exchange pipe 205F1, the lower end side of the heat exchange pipe 201B, the upper end side of the heat exchange pipe 201B, the lower end side of the heat exchange pipe 201X, the upper end side of the heat exchange pipe 201X and the heated side 31A of the absorption solution heat exchanger 31 to the spray pipe 205C.

A cooling circuit for reflux use can be omitted by the above circulation of the concentrated solution 2a and the arrangement of the pipe line 203 on the way to the heat exchange pipe 201B and the heat exchange pipe 201X is facilitates. In the constitution of the second prior art shown in FIG. 12, since there is no flow passage formed by the pipe line 203, an additional pipe line for returning the concentrated solution 2a to a lower portion of the heat exchange pipe 205D must be provided along the pipe line between the heat exchange pipe 205D and the absorption solution heat exchanger 31 so as to increase the GAX effect.

Secondly, the concentrated solution 2a which has passed through the pipe line 203 branched off from the connection section between the pipe line 17 on the upper end side of the heat exchange pipe 201B and the pipe line 8 on the lower end side of the heat exchange pipe 201X is sprayed from a spray pipe 205H arranged right above the rectifying portion 206.

The concentrated solution 2a having a temperature lower than saturation temperature is provided to the rectifying portion 206 by this spraying to absorb heat generated in the rectifying portion 206. Therefore, this spraying is preferably carried out at a location slightly below the intermediate position of the rectifying portion 206.

Moreover, in a portion where the first heat operation fluid 35a circulates in the cooling pipe 201A of the absorber 1 and the cooling side of the condenser 11, the pipe line 20 is divided into pipe lines 20A and 20B to form two routes: one from the pipe line 20B, the cooling side of the condenser 11 and pipe line 20C to cooling pipe 201A of the absorber 1; and the other from pipe line 20A, the cooling side of the absorption/heat exchanger 234 and pipe line 20D to the cooling pipe 201A of the absorber 1. Thus, parallel and serial portions are provided in the cooling flow passage of the first heat operation fluid 35a.

In the absorber 1, firstly, the diluted solution 2c1 whose temperature is raised by causing the refrigerant vapor 7c to be absorbed by alternate shelves 201E provided right below the spray pipe 201D until a state close to phase equilibrium is reached when the temperature of the diluted solution 2c is too low, i.e., overcooling, or the diluted solution 2c1 which is cooled when the temperature of the diluted solution 2c is too high, i.e., overheating, is received and stored in a pan 201J temporarily and then dropped along the heat exchange pipe 201X and the heat exchange pipe 201B from dropping holes formed in the pan 201J. Secondly, the absorption solution 2c2 which has achieved an intermediate concentration while it is dropped along the heat exchange pipe 201X and the heat exchange pipe 201B is temporarily received and stored in a pan 201F provided at a portion half the height of the absorber 1 and then dropped along the cooling pipe 201A from dropping holes formed in the pan 201F and the refrigerant vapor 7c inside the absorber 1 passes through ventilation holes 1B and 1D provided at the outer peripheries of the pans 201F and 201J to flow into chambers partitioned by the pans 201F and 201J, respectively.

Thirdly, a cooling function portion for cooling the absorption function portion of the absorber 1 by means of the first heat operation fluid 35a, i.e., cooling water, is composed of a cooling function portion formed of the cooling pipe 201A provided inside the absorber 1 and a cooling function portion formed of the absorption/heat exchanger 234 which also serves as an absorption function and is arranged outside the absorber 1.

A mixture solution 2d of the concentrated solution 2a and the refrigerant vapor 7c is circulated in the cooled side 234A of the absorption/heat exchanger 234 from the bottom of the absorber 1 through a pipe line 4 and the first heat operation fluid 35a is circulated in the cooling side 234B to carry out an absorption function by the concentrated solution 2a and the refrigerant vapor 7c contained in the mixture solution 2d in the cooled side 234A, and then the remaining refrigerant vapor 7c is discharged or absorbed in the storage portion 235 to cause only the concentrated solution 2a to flow into the pump 3 if possible.

In this instance, the absorption/heat exchanger 234 may be constituted as either one of the following heat exchangers to construct as a small apparatus as possible: (1) a double tube type heat exchanger in which a pipe having a large diameter and a pipe having a small diameter are arranged coaxially, the flow passage of one pipe is made a cooling side, and that of the other pipe is made a cooled side, (2) a shell tube type heat exchanger in which a plurality of small pipes are arranged in parallel in a large can body, flow passages in the plurality of small pipes are made cooling sides or cooled sides and a flow passage formed between the large can body and the plurality of small pipes is made a cooled side or a cooling side, (3) a shell-coil can heat exchanger in which a small coiled pipe is arranged inside a large can body and a flow passage in the coiled pipe is made a cooling side or cooled side and a flow passage between the can body and the coiled pipe is made a cooled side or cooling side, and (4) a plate type heat exchanger in which two ladder-like wavy plates having surface irregularities are laminated together and a plurality of through passages formed in the irregular portions of the plates are interconnected to form two flow passages, and one passage is made a cooling side and the other is made a cooled side. The absorption/heat exchanger 235 is installed in the remaining space of the apparatus left after the absorber 1 and the generator 5 have been installed so that it can be installed in the same capacity as that of the prior art apparatus.

When viewing from the flow of the first heat operation fluid 35a flowing from the pipe line 20A to the pipe line 21, the cooing side 234B of the absorption/heat exchanger 234 and the cooling pipe 201A of the absorber 1 are connected in series. However, the cooling side 234B of the absorption/ heat exchanger 234 and the cooling pipe 201A of the absorber 1 may be connected in parallel by changing the flow passages of the pipes 20A, 20C and 20D as shown in FIG. 5 according to the distribution of the cooling amount to the cooling side of the condenser 11 and the cooling pipe 201A.

In the constitution of FIG. 1, only one cooling function portion arranged outside the absorber 1, i.e., the absorption/ heat exchanger 234 is arranged. However, a plurality of absorption/heat exchangers similar to the absorption/heat exchanger 234 may be arranged to constitute the cooling function portion.

[Embodiment 2]

Figure 2:
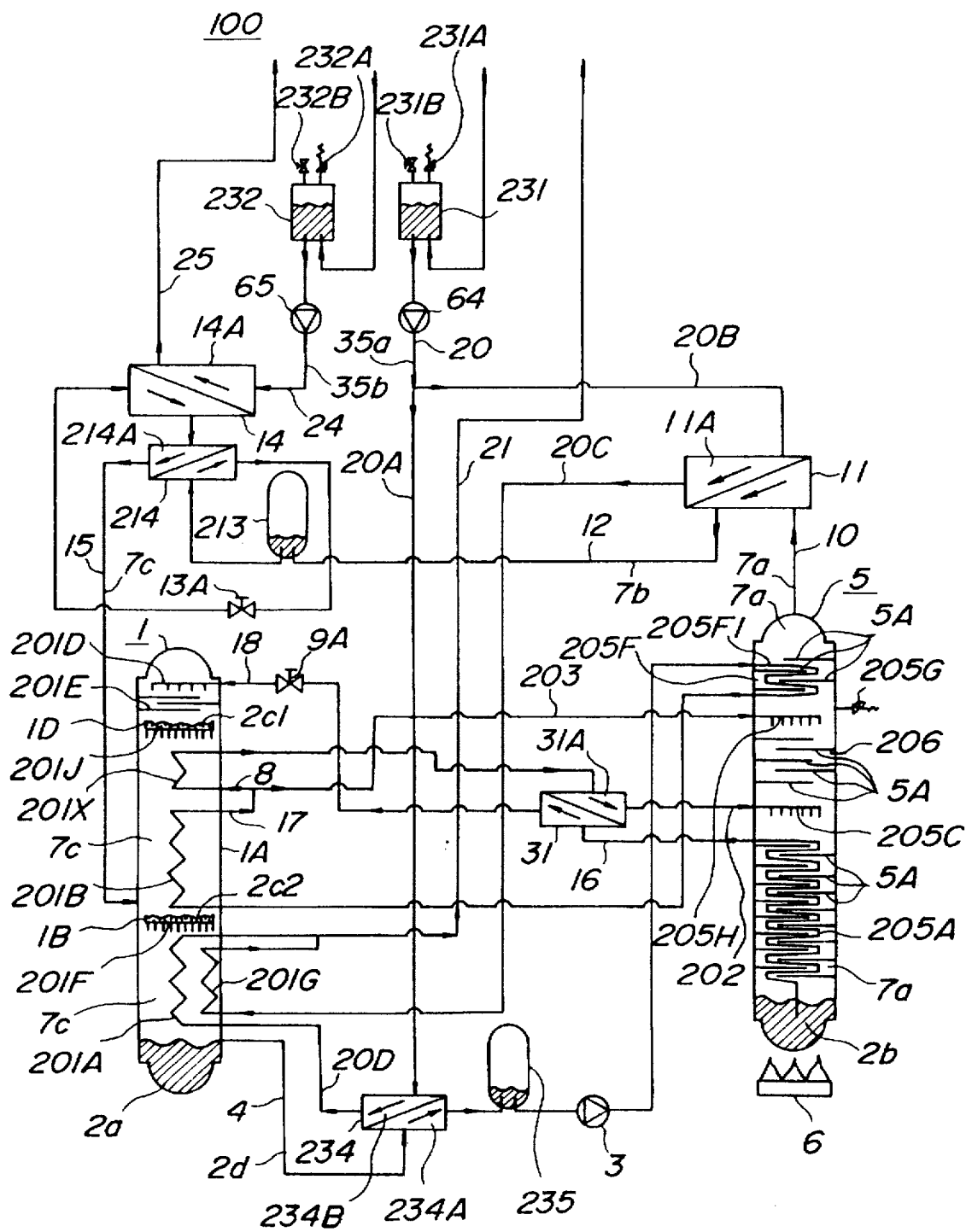
Figure 6:
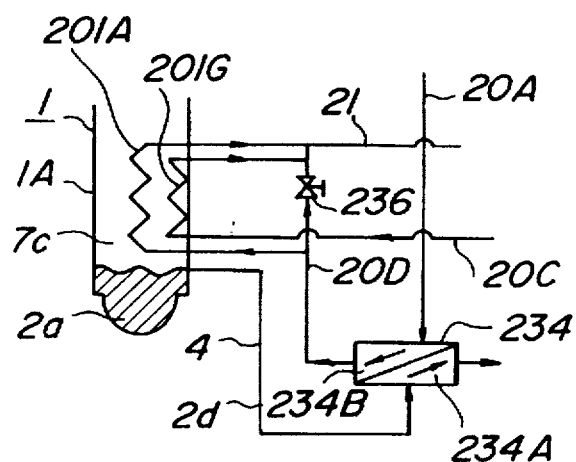

With reference to FIGS. 2 and 6, Embodiment 2 of the present invention will be described. The difference between the constitution of FIG. 2 and the constitution of FIG. 2 are as follows.

Another cooling pipe 201G is provided at a location where the cooling pipe 201A is arranged inside the absorber 1, the lower end side of the cooling pipe 201G is connected to the pipe line 20C, the upper side of the cooling pipe 201G is connected to the pipe line 21, and the lower end side of the cooling pipe 201A is connected only to the pipe line 20D so that the first heat operation fluid 35a flows parallel in the cooling pipe 201A and the cooling pipe 201G.

The cooling pipe 201A and the cooling pipe 201G are constituted such that a coiled pipe line having a small coiling diameter is placed inside the coil of a coiled pipe line having a large coiling diameter to form two cooling pipes without increasing the outer diameter and height thereof, one of the thus formed two coiled pipe lines is made the cooling pipe 201A and the other the cooling pipe 201G. In this way, the two cooing pipes 201A and 201G are provided without increasing the size of the absorber 1.

The flow passage of the first operation fluid 35a, i.e., cooling water, formed by the cooling pipe 201A, the cooling pipe 201G and the cooling side 234B of the absorption/heat exchanger 234 may be constituted such that a flow passage formed by the pipe lines 20A, 20C and 20D is changed as shown in FIG. 6 according to the distribution of the cooling amount to the cooling side of the condenser 11 and the cooling pipe 201A like a modification of the above Embodiment 1 shown in FIG. 5 and a flow control valve 236 is directly provided along a flow passage toward the pipe line 21 from the pipe line 20D to arrange the cooling side 234B of the absorption/heat exchanger 234 and the cooling pipe 201A of the absorber 1 in parallel.

In the constitution of FIG. 2, the cooling function portion provided inside the absorber 1 is composed of two cooling pipes 201A and 201G. The number of cooling pipes for forming the cooling function portion may be three which are arranged likewise. Or, although there is only one cooling function portion which is arranged outside the absorber 1, i.e., absorption/heat exchanger 234, a plurality of absorption/heat exchangers similar to the absorption/heat exchanger 234 may be provided to constitute the cooling function portion, or the absorption/heat exchanger 234 may be removed.

[Embodiment 3]

With reference to FIGS. 3, 4(a), 4(b) and 7, Embodiment 3 of the present invention will be described. The differences between the constitution of FIG. 3 and the constitution of FIG. 2 are as follows.

Another cooling pipe 201H is provided outside the location of the cooling pipe 201A inside the absorber 1, the lower end of the cooling pipe 201H is connected to the pipe line 20C, the upper end side of the cooling pipe 201H is connected to the pipe line 21, and the lower end side of the cooling pipe 201A is connected only to the cooling pipe 20D so that the first heat operation fluid 35a flows parallel in the cooling pipe 201A and the cooling pipe 201H.

Figure 4A:
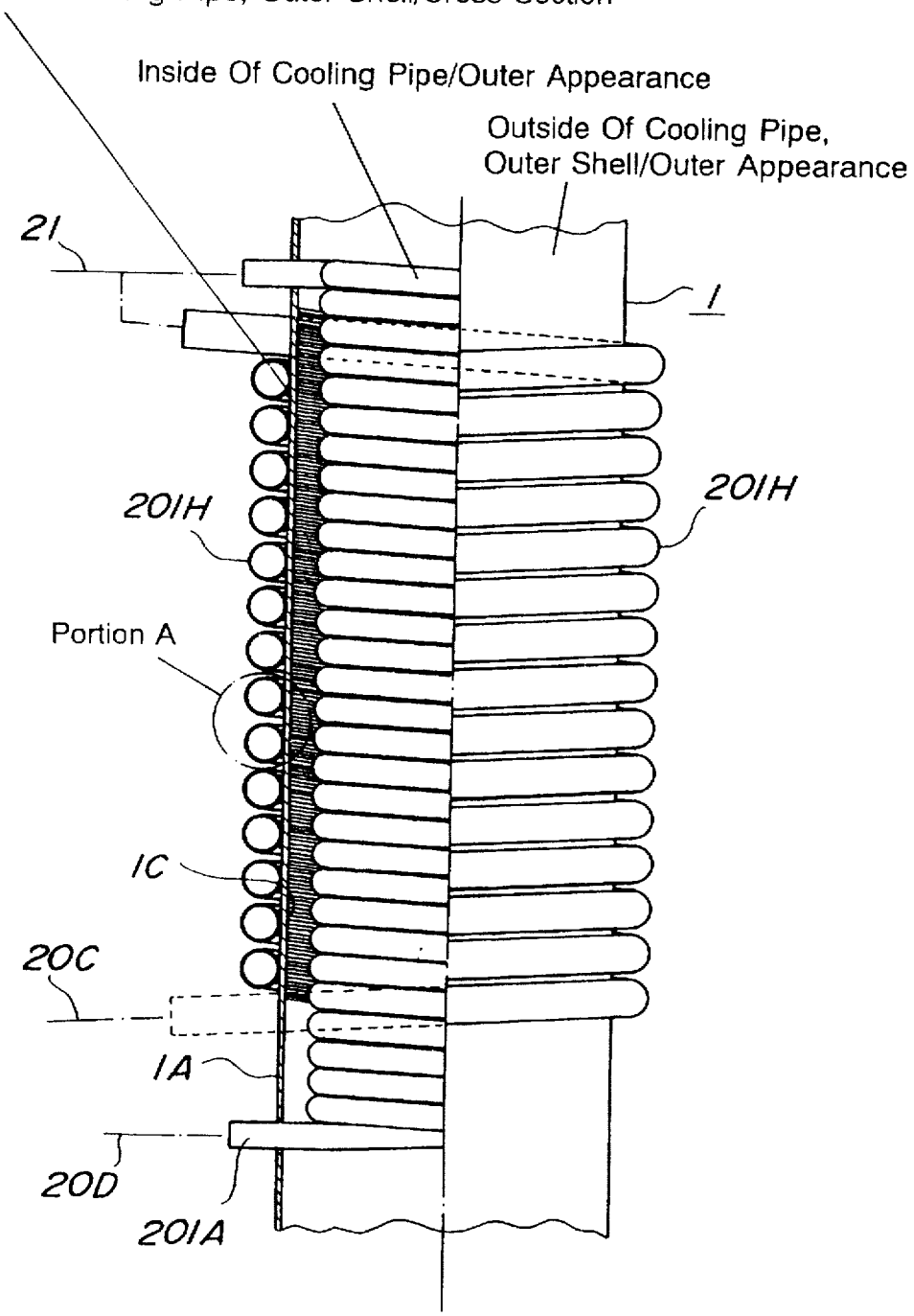
FIG. 4(a) is a sectional view of key portions including a cooling pipe coiled around the outer shell of the absorber.
Figure 4B:
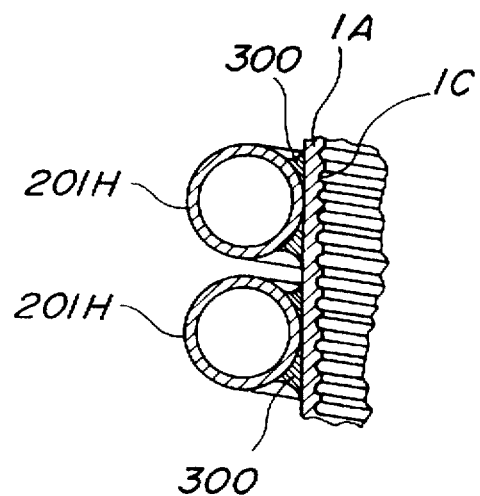
FIG. 4(b) is an enlarged sectional view of a part of FIG. 4(a)

To have the cooling pipe 201H perform cooling operation efficiently, as shown in FIG. 4(a), the cooling pipe 201H is coiled around the outer shell 1A of the absorber 1 in such a manner that it is closely adhered to the outer periphery of the outer shell 1A, and the cooling pipe 201H made of a copper material and the outer shell 1A made of a stainless steel material are soldered together with silver or copper 300 so that the outer shell 1A is integrated with the cooling pipe 201H to achieve good heat conduction, as shown in FIG. 4(b). At the same time, the inner wall of the outer shell 1A is threaded or multi-grooved to form a continuous irregular surface 1C so as to increase the heat conduction area.

Figure 7:
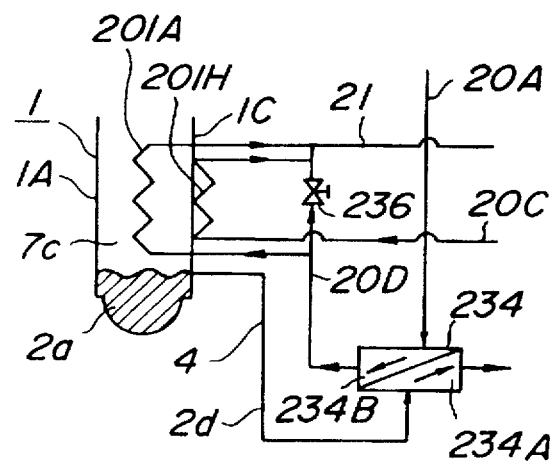

The flow passage of the first operation fluid 35a, i.e., cooling water, formed by the cooling pipe 201A, the cooling pipe 201H and the cooling side 234B of the absorption/heat exchanger 234 may be constituted such that a flow passage formed by the pipe lines 20A, 20C and 20D is changed as shown in FIG. 7 according to the distribution of the cooling amount to the cooling side 234B of the condenser 11 and the cooling pipe 201A like a modification of the above Embodiment 2 shown in FIG. 6 and a flow control valve 236 is directly provided along a flow passage toward the pipe line 21 from the pipe line 20D to arrange the cooling side 234B of the absorption/heat exchanger 234 and the cooling pipe 201A of the absorber 1 in parallel.

Figure 3:
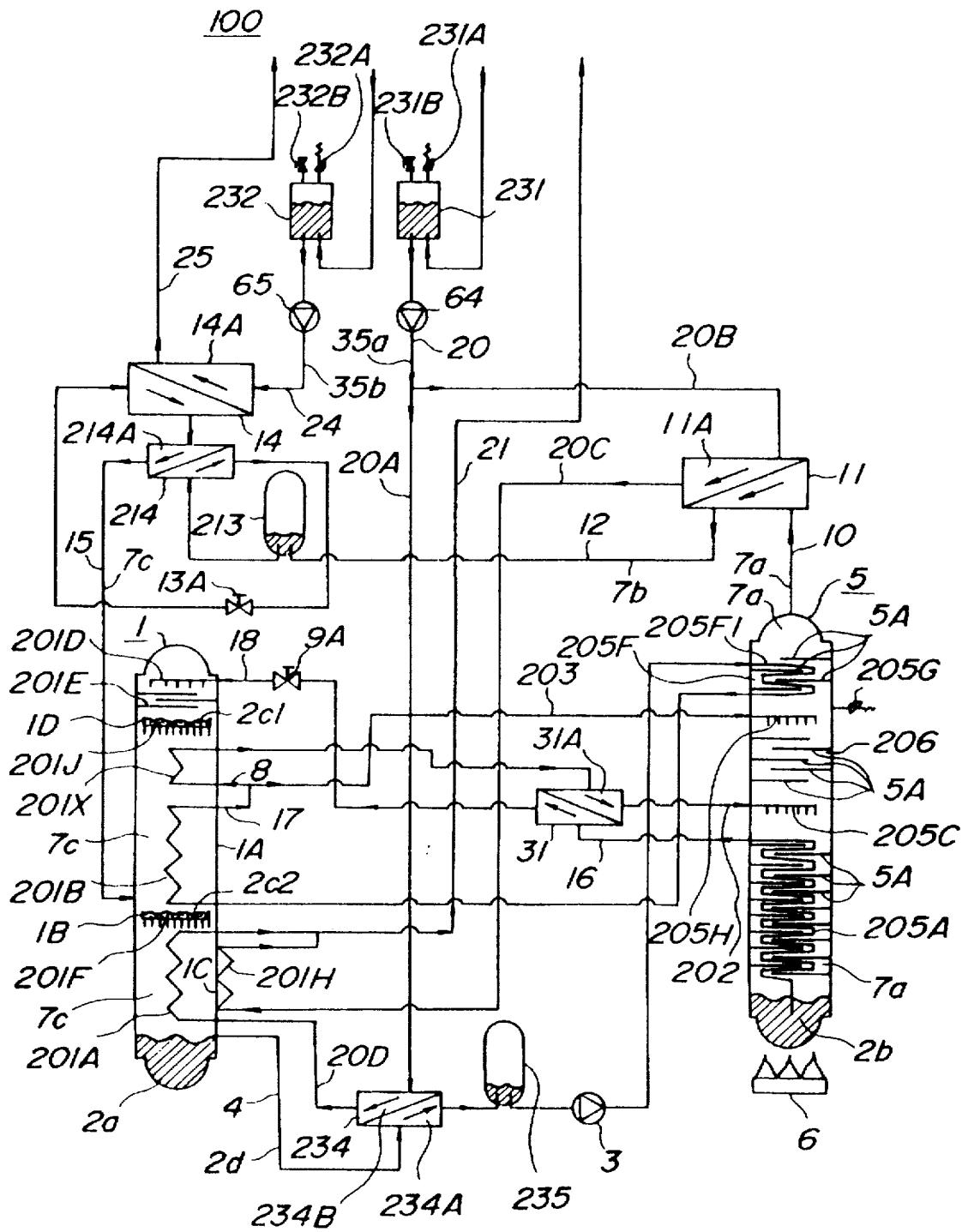

In the constitution of FIG. 3, the cooling function portion provided inside the absorber 1 is composed of only two cooling pipes 201A and 201G. The number of cooling pipes for forming the cooling function portion may be three which are arranged likewise. Or, although there is only one cooling function portion which is arranged outside the absorber 1, i.e., absorption/heat exchanger 234, a plurality of absorption/heat exchangers similar to the absorption/heat exchanger 234 may be provided to constitute the cooling function portion, or the absorption/heat exchanger 234 may be removed.

[Summary of Constitutions of Embodiments]

When the constitutions of the above Embodiments 1 to 3 are summarized, in an absorption type refrigerating apparatus 100 for obtaining a heat source for cooling or heating a desired heat operation object, e.g., indoor air, by means of a second heat operation fluid 35b, e.g., cool/hot water for heat exchanging with an evaporation function portion, i.e., evaporator 14, while cooling an absorption function portion, i.e., absorber 1, and a condensation function portion, i.e., condenser 11, by means of a first heat operation fluid 35a, e.g., cooling water, by providing an absorption solution circulation system for circulating absorption solutions 2a, 2b and 2c through the absorption function portion, e.g., absorber 1 for causing refrigerant vapor 7c to be absorbed into an absorption solution, i.e., a diluted solution 2c, to obtain a concentrated solution 2a by absorption, and a refrigerant circulation system for circulating a refrigerant through a generation function portion, e.g., generator 5 for generating refrigerant vapor 7c from the absorption solution 2b, the condensation function portion, e.g., condenser 11 for obtaining a refrigerant solution 7b by condensing the generated refrigerant vapor 7c, and the evaporation function portion, e.g., evaporator 14 for obtaining the refrigerant vapor 7c by evaporating this refrigerant solution 7b, there is formed first constitution comprising: a plurality of absorption function means for dividing a cooling function portion for cooling the absorption heat of the above absorption function portion, i.e., the absorber 11, by means of the above first heat operation fluid 35a into a plurality of cooling function sub-portions, e.g., the cooling pipe 201A and the cooling side 234B of the absorption/heat exchanger 234; and cooling flow passage means for connecting the flow passages of the first heat operation fluid 35a to the plurality of cooling function sub-portions, i.e., the cooling pipe 201A and the cooling side 234 of the absorption/heat exchanger 234, in series like a route formed by the pipe lines 20A, 20D and 21.

According to Embodiments 2 and 3, in the above-described absorption type refrigerating apparatus, there is formed second constitution comprising:

a plurality of absorption function means for dividing a cooling function portion for cooling the absorption heat of the above absorption function portion, i.e., the absorber 1, by means of the above first heat operation fluid 35a into a plurality of cooling function sub-portions, e.g., the cooling pipe 201A and the cooling pipe 201G in Embodiment 2 and the cooling pipe 201A and the cooling pipe 201H in Embodiment 3; and cooling flow passage means for connecting the flow passages of the first heat operation fluid 35a to the plurality of cooling function sub-portions, i.e., the cooling pipe 201A and the cooling pipe 201G in Embodiment 2 and the cooling pipe 201A and the cooling pipe 201H in Embodiment 3 in parallel like a route formed by the pipe lines 20C and 21 and a route formed by the pipe lines 20A, 20D and 21.

Further, according to Embodiment 2, in the above-described absorption type refrigerating apparatus 100, there is formed third constitution comprising:

a plurality of absorption function means for dividing a cooling function portion for cooling the absorption heat of the above absorption function portion, i.e., the absorber 1, by means of the above first heat operation fluid 35a into a plurality of cooling function sub-portions, e.g., the cooling pipe 201A and the cooling pipe 201G, arranged inside the above absorption function portion, i.e., the absorber 1; and cooling flow passage means for connecting the flow passages of the first heat operation fluid 35a to the plurality of cooling function sub-portions, i.e., the cooling pipe 201A and the cooling pipe 201G, in parallel like a route formed by the pipe lines 20C and 21 and a route formed by the pipe lines 20A, 20D and 21.

Further, according to Embodiment 3, in the above-described absorption type refrigerating apparatus 100, there is formed fourth constitution comprising:

a plurality of absorption function means for dividing a cooling function portion for cooling the absorption heat of the above absorption function portion, i.e., the absorber 1, by means of the first heat operation fluid 35a into a cooling function sub-portion, e.g., the cooling pipe 201A, arranged inside the above absorption function portion, i.e., the absorber 1, and a cooling function sub-portion, e.g., the absorption/heat exchanger 234, arranged outside the above absorption function portion, i.e., the absorber 1; and cooling flow passage means for connecting the flow passages of the first heat operation fluid 35a to the above cooling function sub-portion arranged inside, i.e., the cooling pipe 201A and the above cooling function sub-portion arranged outside, i.e., the absorption/heat exchanger 234, in series like a route formed by the pipe lines 20A, 20D and 21.

Further, according to Embodiment 2, in the above-described absorption type refrigerating apparatus 100, there is formed fifth constitution comprising:

a plurality of absorption function means for dividing a cooling function portion for cooling the absorption heat of the above absorption function portion, i.e., the absorber 1, by means of the first heat operation fluid 35a into a plurality of cooling function sub-portions, e.g., the cooling pipe 201A and the cooling pipe 201G, arranged inside the above absorption function portion, i.e., the absorber 1, and a cooling function sub-portion, e.g., the absorption/heat exchanger 234, arranged outside the above absorption function portion, i.e., the absorber 1; and cooling flow passage means for connecting the flow passages of the first heat operation fluid 35a to the cooling function sub-portions arranged inside, i.e., the cooling pipe 201A and the cooling pipe 201G, in parallel like a route formed by the pipe lines 20C and 21 and a route formed by the pipe lines 20A, 20D and 21, and connecting the flow passage of the first heat operation fluid 35a to the cooling function sub-portion arranged outside, i.e., the absorption/heat exchanger 234, in series like a route formed by the pipe lines 20A, 20D and 21.

According to Embodiment 3, in the above-described absorption type refrigerating apparatus 100, there is formed sixth constitution comprising:

a plurality of absorption function means for dividing a cooling function portion for cooling the absorption heat of the above absorption function portion, i.e., the absorber 1, by means of the first heat operation fluid 35a into a cooling function sub-portion, e.g., the cooling pipe 201A, arranged inside the above absorption function portion, i.e., the absorber 1, and a plurality of cooling function sub-portions, e.g., the cooling pipe 201H and the absorption/heat exchanger 234, arranged outside the above absorption function portion, i.e., the absorber 1; and cooling flow passage means for connecting the flow passages of the first heat operation fluid 35a to the cooling function sub-portion arranged inside, i.e., the cooling pipe 201A, and one of the cooling function sub-portions arranged outside, i.e., the cooling pipe 201H, in parallel like a route formed by the pipe lines 20C and 21 and a route formed by the pipe lines 20A, 20D and 21 and connecting the flow passage of the first heat operation fluid 35a to the other cooling function sub-portion arranged outside, i.e., the absorption/heat exchanger 234, in series like a route formed by the pipe lines 20A, 20D and 21.

Figure 9:
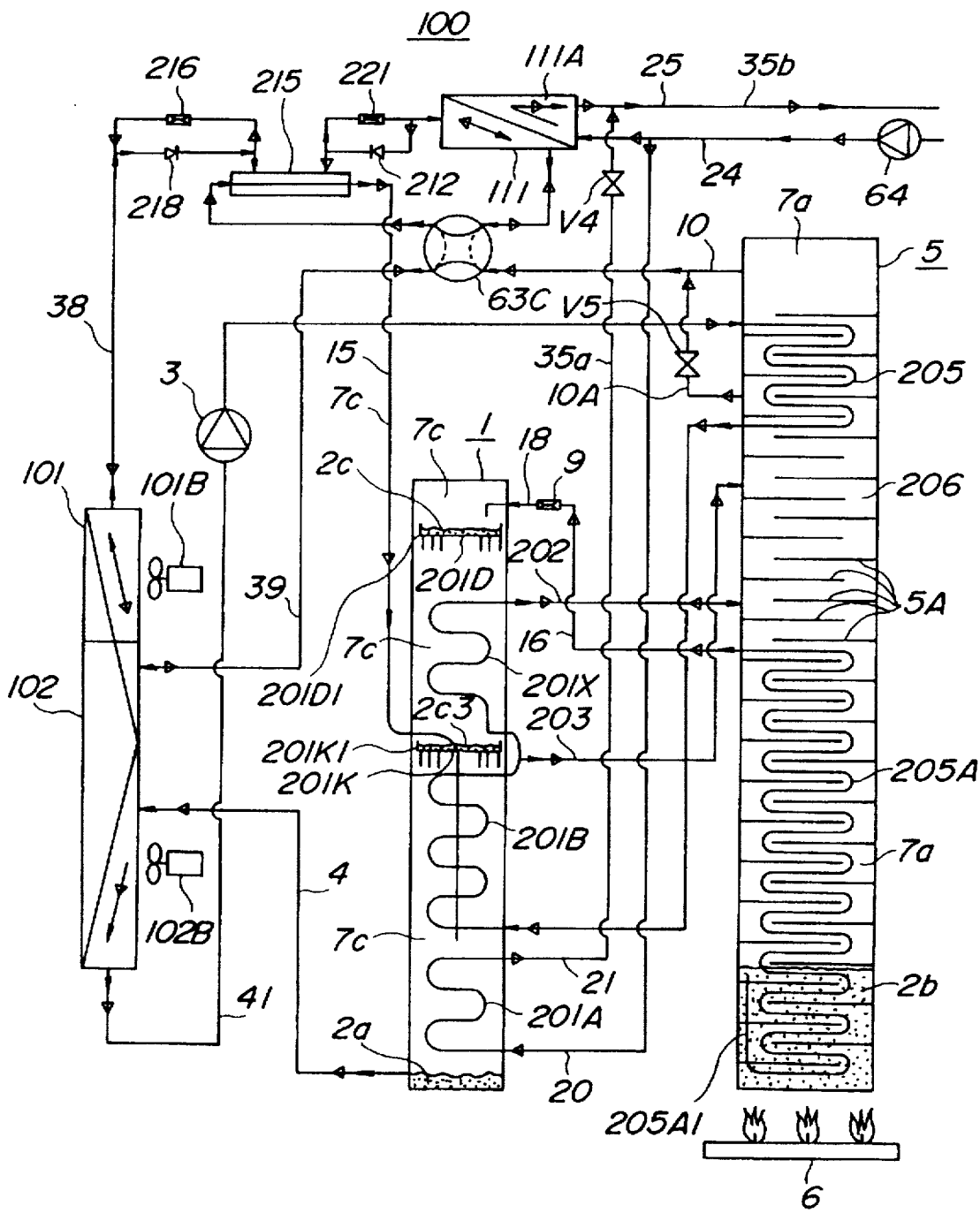
Figure 10:
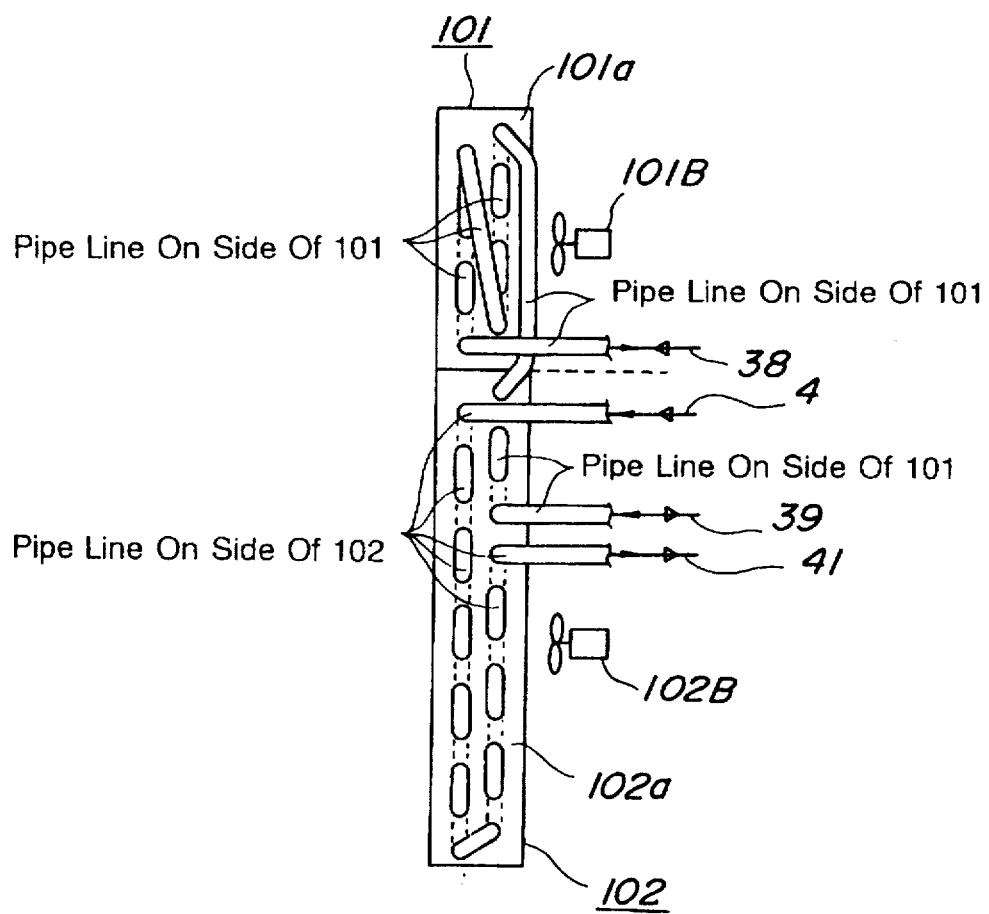
Figure 11:
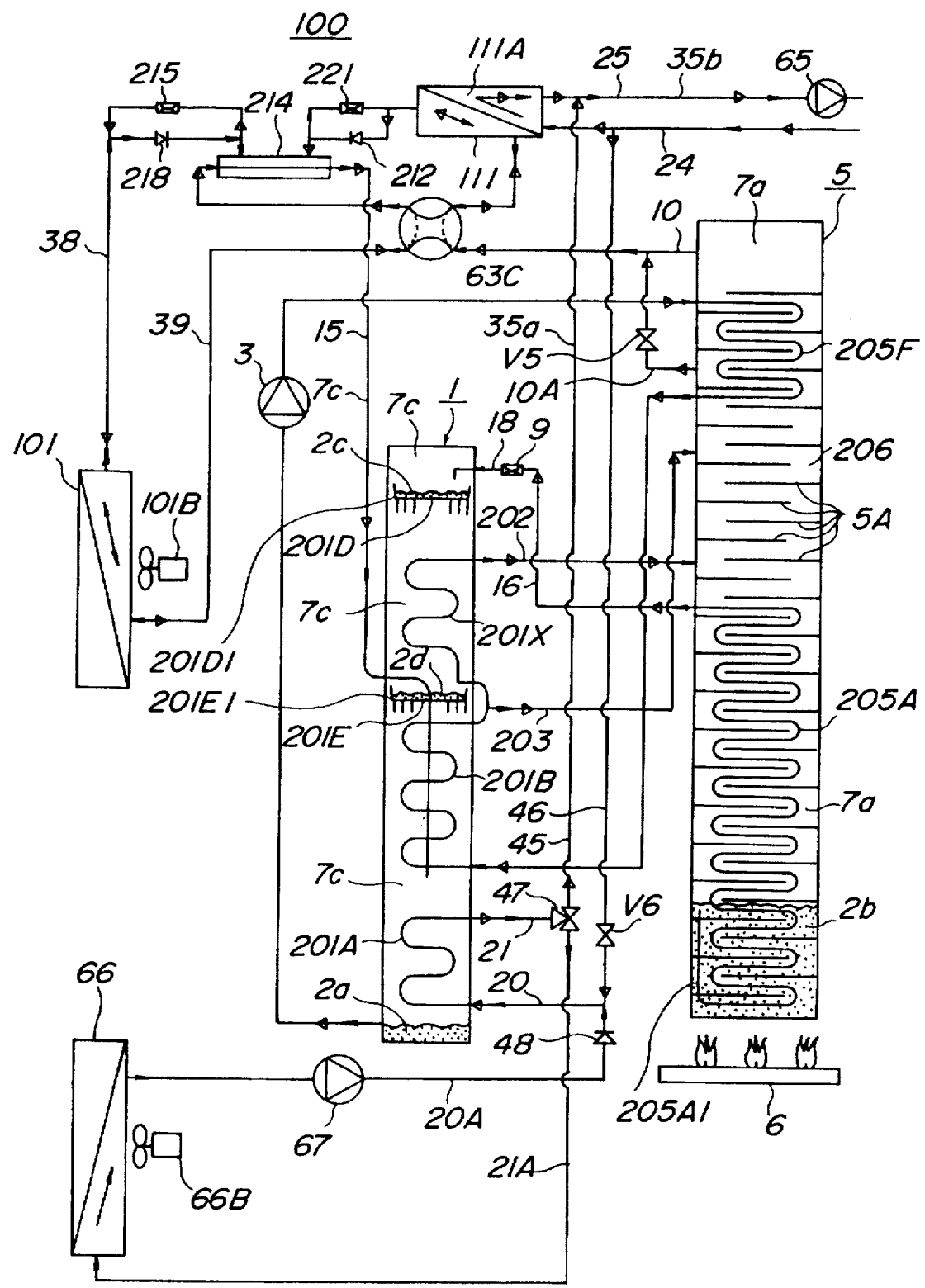

With reference to FIGS. 9 to 11, Embodiments 4, 5 and 6 of the present invention will be described. In these Embodiments, the absorption solution heat exchanger 31 is removed from the constitution of the prior art shown in FIG. 12. A flow direction in each pipe line shown by an arrow is for cooling operation, i.e., a route taken by each fluid for cooling operation and a flow direction shown by an arrow is for heating operation, i.e., a route taken by each fluid for heating operation. Paths shown by solid lines formed by pipe line connections by means of the pipe line connection switch 63C is for cooling operation and paths shown by dotted lines formed by pipe line connections is for heating operation.

[Embodiment 4]

With reference to FIG. 9, Embodiment 4 of the present invention will be described. The differences between the constitution of FIG. 9 and the constitution of FIG. 12 are as follows. In the generator 5, firstly, most of the inner portion is partitioned by spiral shelves 5A arranged spirally on the inner wall of the outer shell, the heat exchanger 205A is coiled and arranged between adjacent spiral shelves 5A, and a rising portion 205A1 is provided on the lower end side so that heat exchange between the refrigerant vapor 7a and the diluted solution 2b in the heat exchanger 205A can be improved.

Secondly, the rectifying portion 206 rectifies making use of a passage formed by the spiral shelves 5A and at the uppermost portion of the generator 5, a reflux portion 205F is formed of a pipe line which is coiled such that the heat exchange pipe 205F1 can follow the spiral shelves 5A.

Thirdly, a pipe line 10A equipped with an opening/closing valve V5 is provided to give a relatively high-temperature portion of the refrigerant vapor 7a in the generator 5 directly to the heating side of a heat exchanger 111 for condensation/evaporation to be described hereinafter.

In the refrigerant circulation system from the pipe line 10 to the pipe line 15, firstly, the pipe line connection switch 63C is formed of a pipe line connection switch for switching and connecting four pipe lines, e.g., a four-way valve.

Secondly, the heat exchanger 111 for condensation/evaporation is caused to serve as a condenser during cooling operation and as an evaporator during heating operation by reversing the route of the refrigerant circulation system by means of the pipe line connection switch 63C. As the result, the opening/closing valve V4 can be used to switch between the flow passage of the first heat operation fluid 35a and the flow passage of the second heat operation fluid 35b without using a multi-flow passage switch such as a four-way valve.

Thirdly, along the circulation path, there are provided a heat exchanger 101 for cooling air equipped with a fan 101B for heat exchange between the refrigerant and the outside air, a double-tubular heat exchanger 215 for preheating the refrigerant vapor 7c injected into the absorber 1 by means of the refrigerant solution on the high-temperature side of the circulation path during cooling operation, and pressure reducing units 221 and 216 and check valves 212 and 218 for returning the circulation path of the refrigerant in the preheating heat exchanger to a normal path after the reversal of the route of the refrigerant circulation system by the pipe line connection switch 63C in order to increase heat operation efficiency.

Further, in the absorber 1, firstly, the spray pipe 201D is formed of a spray unit formed by arranging small tubes for dropping around a plate-like member arranged at an upper part of the absorber 1, and a spray unit 201K having a similar structure is provided between the heat exchange pipe 201X and the heat exchange pipe 201B so that the diluted solution which has been sprayed from the spray unit 201D and has absorbed the refrigerant vapor 7c while it is dropping along the heat exchange pipe 201X is temporarily received and stored in the spray unit 201K as an intermediate solution 2c3, and then is caused to flow down along the heat exchange pipe 201B and the cooling pipe 201A form the spray unit 201K to increase absorption efficiency. The refrigerant vapor 7c is caused to flow through the through holes 201D1 and 201K1 formed around the outer periphery of the spray units 201D and 201K.

Thirdly, the refrigerant vapor 7c which has been introduced into the absorber 1 from the pipe line 15 is guided from the center of the spray unit 201K to the center portions of the coiled heat exchange pipe 201B and cooling pipe 201A to increase absorption efficiency. In other words, convection and diffusion in the absorber 1 are suppressed by dividing the absorber 1 into upper and lower chambers by means of the spray unit 201K, whereby the amount of contact between the refrigerant vapor and the diluted solution can be increased and equilibrium can be brought to perfection.

In the circulation system of the absorption solution, firstly, a heat exchanger 102 for cooling air equipped with a fan 102B for heat exchange between the concentrated solution 2a accumulated in the bottom of the absorber 1 and the outside air is provided to cause the refrigerant vapor 7c contained in a mixture fluid containing the concentrated solution 2a and the refrigerant vapor 7c which is flown in together with the concentrated solution 2a to be absorbed into the concentrated solution 2a and circulate in order to prepare an absorption solution having a high concentration. At the same time, during heating operation, the concentrated solution 2a is prevented from being cooled excessively by stopping or reducing a heat exchange function by stopping or slowing down the fan 102B. Thus, a heat loss caused by the heat discharge of heat exchanger 102 for cooling air is reduced and heat collection by heating the refrigerant vapor 7c is promoted so as to enhance heat exchange efficiency.

Secondly, at each beginning of the start of heating operation, the opening/closing valve V5 is opened to give the high-temperature refrigerant vapor 7c directly to the heat exchanger 111 for condensation/evaporation so that a delay in starting heating operation at the beginning of the start of heating operation including return to heating operation from defrosting operation can be eliminated.

Thirdly, the heat exchange pipe 201B and the heat exchange pipe 201X are connected in series, the absorption solution having a low concentration at a temperature close to saturation temperature is provided to an upper portion of the rectifying portion 206 from the pipe line 203 branched off at the connection point between these heat exchange pipes, and the absorption solution which is a mixture fluid containing the refrigerant vapor and the concentrated solution and having a relatively high temperature is provided to a lower portion of the rectifying portion 206 from the pipe line 202 on the upper end side of the heat exchange pipe 201X. Thus the GAX function can be improved.

A heat transmission loss caused by heat exchange operation between the first heat operation fluid 35a and the second heat operation fluid 35b can be eliminated with simple constitution that, in the paths of the circulation systems for the first heat operation fluid 35a, i.e., cooling water, and the second heat operation fluid 35b, i.e., cool/hot water, the pipe lines 20 and 21 of the first heat operation fluid 35a and the pipe lines 24 and 25 of the second heat operation fluid 35b are connected in parallel, and the opening/closing valve V4 is provided in the pipe line 25 of the first heat operation fluid 35a so that it is opened during heating operation to join the first heat operation fluid 35a and the second heat operation fluid 35b and circulate the joined fluids and closed during cooling operation to intercept the joining of the first heat operation fluid 35a and the second heat operation fluid 35b.

[Summary of Constitution of Embodiment 4]

When the constitution of the above Embodiment 4 is summarized, in an absorption type refrigerating apparatus 100 for obtaining a heat source for cooling or heating a desired heat operation object, e.g., indoor temperature, by means of a second heat operation fluid 35b, e.g., cool/hot water for heat exchanging with a refrigerant circulation system while cooling the absorption heat of an absorption function portion, i.e., absorber 1, by means of a first heat operation fluid 35a, e.g., cooling water, by providing an absorption solution circulation system for circulating absorption solutions 2a, 2b and 2c through the absorption function portion, e.g., absorber 1 for causing refrigerant vapor 7c to be absorbed into an absorption solution, i.e., a diluted solution 2c, to obtain a concentrated solution 2a by absorption, and the refrigerant circulation system for circulating a refrigerant through a generation function portion, e.g., generator 5 for generating refrigerant vapor 7c from the absorption solution 2b and a function portion, e.g., a heat exchanger 111 for condensation/evaporation and a heat exchanger 101 for cooling air, which functions as a condensation function portion for obtaining condensed refrigerant 7b by condensing the generated refrigerant vapor 7a and as an evaporation function portion for obtaining refrigerant vapor 7c by evaporating this condensed refrigerant 7b, there is formed seventh constitution comprising:

refrigerant path switching means for switching between cooling and heating operations to be carried out by the second heat operation fluid 35b by reversing the path of the refrigerant circulation system with respect to the heat exchanger 111 for condensation/evaporation by the connection switching operation of the pipe line connection switch 63C which is formed of a four-way valve; and heat operation fluid joining means for joining the flow passage of the first heat operation fluid 35a, i.e., cooling water, and the flow passage of the second heat operation fluid 35b, i.e., cool/hot water, by opening an opening/closing valve V4 during heating operation and intercepting joining by closing the opening/closing valve V4 during cooling operation.

In addition to the above seventh constitution, there is formed eighth constitution comprising:

heating operation starting means for providing high-temperature refrigerant vapor, e.g., the refrigerant vapor 7a present around the intermediate portion of the reflux portion 205F in the generation function portion, i.e., the generator 5, to the heat exchange function portion, i.e., the heat exchanger 111 for condensation/evaporation, at each beginning of the start of heating operation.

Further, in addition to the above seventh constitution, there is formed ninth constitution comprising:

outside air heat exchanging means for providing a first outside air heat exchange function portion, e.g., a heat exchanger 101 for cooling air, for heat exchanging the above refrigerant vapor 7a with the outside air in the circulation path of the above refrigerant vapor 7a and a second outside air heat exchange function portion, e.g., a heat exchanger 102 for cooling air, for heat exchanging the above absorption solution 2a with the outside air in the circulation path of the above absorption solution 2a; and heating time operation means for stopping or reducing the heat exchange function of the second outside air heat exchange function portion, i.e., the heat exchanger 102 for cooling air, during heating operation, e.g., stopping or slowing down a fan 102B.

[Embodiment 5]

With reference to FIGS. 9 and 10, Embodiment 5 of the present invention will be described. The heat exchanger 102 for cooling air of FIG. 9 is formed of a so-called fin radiator. That is, as shown in FIG. 10, it is constituted such that pipe lines 4 and 41 which penetrate in a zigzag manner one side surface of a fin 102a which is formed by stacking up a large number of aluminum thin plates arranged with a small space therebetween are provided between one side surface and the opposite side surface of the fin 102a and air blown by the fan 102B is let passing through the narrow spaces of the fin 102a.

The heat exchanger 101 for cooling air is constituted likewise that pipe lines 38 and 39 which penetrate in a zigzag manner a fin 101a are provided and air blown by the fan 101B is let passing through the narrow spaces of the fin 101a.

In the constitution of FIG. 10, part of the pipe line 39 which must be caused to penetrate the fin 101a of the heat exchanger 101 for cooling air is caused to penetrate a high-temperature portion of the fin 102a of the heat exchanger 102 for cooling air so that an unevaporated refrigerant contained in the refrigerant vapor passing through the pipe lines 38 and 39 can be heated and evaporated. Thus heat efficiency can be enhanced.

[Summary of Constitution of Embodiment 5]

When the constitution of the above Embodiment 5 is summarized, there is formed tenth constitution comprising:

inclusive heat exchanging means for causing part of the above first outside air heat exchange function portion, i.e., part of the pipe line 39 of the heat exchanger 101 for cooling air, to penetrate a high-temperature portion of the fin 102a so that it is arranged in a high-temperature portion of the second outside air heat exchange function portion, i.e., the heat exchanger 102 for cooling air, in place of the heating time operation means of the above ninth constitution.

[Embodiment 6]

With reference to FIG. 11, Embodiment 6 will be described. In FIG. 11, the differences from the constitution of FIG. 9 are as follows. Firstly, the air-cooled heat exchanger 102 for cooling the absorption solution, i.e., the concentrated solution 2a is removed and instead, an air-cooled heat exchanger 66 equipped with a fan 66B is arranged only for discharging heat from the first heat operation fluid 35a, i.e., cooling water.

Secondly, to circulate the first heat operation fluid 35a only in a path for cooling with the air-cooled heat exchanger 66 during cooling operation and join the first heat operation fluid 35a and the second heat operation fluid 35band circulate the joined fluids during heating operation, the pipe lines 20A, 21A, 45 and 45 branching off from the pipe line 20 and the pipe line 21 are provided, a flow passage connection switch 47 formed of a three-way valves or a combination of opening/closing valves is arranged at the diverging point of the pipe lines 21, 21A and 46 in place of the opening/closing valve V4, and a check valve 48 and an opening/closing valve V6 are provided at the diverging point of the pipe lines 20, 20A and 45 on the side of the pipe line 20A and on the side of the pipe line 45, respectively.

Thirdly, the pipe line connection switch 47 is controlled such that only the flow passage between the pipe lines 21 and 21A is opened during cooling operation and only the flow passage between the pipe lines 21 and 46 is opened during heating operation, the opening/closing valve V6 is closed during cooling operation and opened during heating operation, and the fan 61B and the pump 64 become operative during cooling operation only.

[Summary of Constitution of Embodiment 6]

When the constitution of the above Embodiment 6 is summarized, there is formed eleventh constitution to solve the above problems, which comprises:

in place of the heat operation fluid joining means in the above seventh constitution, outside air heat exchanging means for providing a first outside air heat exchange function portion, e.g., the heat exchanger 101 for cooling air, for heat exchanging the above refrigerant vapor 7c with the outside air in the circulation path of the refrigerant vapor 7c; and outside air heat discharging means for providing a heat exchange function portion, e.g., the air-cooled heat exchanger 66 with the fan 61B, for heat exchanging the above first heat operation fluid 35a, i.e., cooling water, with the outside air and for operating the flow passage connection switch 74 and the opening/closing valve V6, for example, to separate and circulate the first heat operation fluid 35a, i.e., cooling water, and the second heat operation fluid 35b, i.e., cool/hot water, during cooling operation and to join the above first heat operation fluid 35a and the above second heat operation fluid 35b during heating operation.

[Modifications]

This invention can be modified in the following manner.

Figure 8:
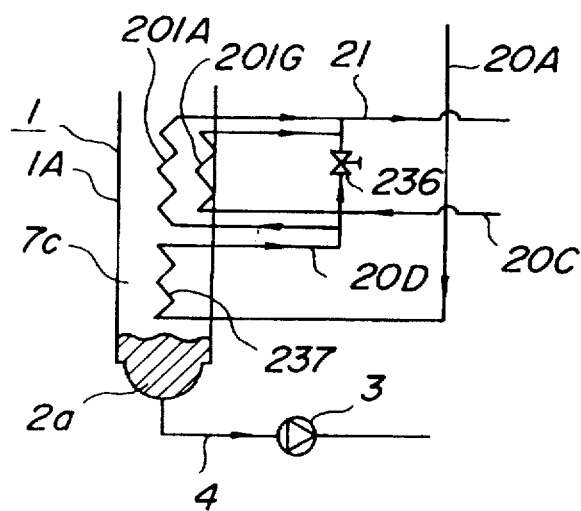

(1) The first to sixth constitutions are applied to the constitution of FIG. 8.

(2) A take-in port for the pipe line 4 located at a bottom portion of the absorber 1 in Embodiments 1 to 3, as shown by a dotted line in FIG. 1, is constituted such that the pipe line 4a provided at a height corresponding to the position of the refrigerant vapor 7c and the pipe line 4b provided at a position below the surface of the concentrated solution 2a are joined into a single pipe line 4 so that, even if the surface of the concentrated solution 2a changes, the refrigerant vapor 7c and the concentrated solution 2a can be introduced into the cooled side 234A of the absorption/heat exchanger 234.

(3) This invention is applied to an absorption refrigerating apparatus which uses a fluid other than water as the first heat operation fluid 35a.

(4) In the constitutions of FIGS. 1 to 3 and the constitutions of FIGS. 5 to 7, as shown in FIG. 8, a heat exchange pipe 237 is provided at the lowest portion of the absorber 1, i.e., right above the concentrated solution 2a in place of the absorption/heat exchanger 234, and the lower end side of the heat exchange pipe 237 is connected to the pipe line 20A and the upper end side thereof is connected to the pipe line 20D. That is, taking the constitution of FIG. 7 as an example, pipe line connection as shown in FIG. 8 is made and is applied to the constitutions of FIGS. 1 to 3 and FIGS. 5 and 6.

(5) The absorption solution heat exchanger 31 between the pipe line 16 and the pipe line 202 is removed.

(6) The flow control valve 236 and the pipe line provided with the flow control valve 236 in the flow passage constitutions of FIGS. 6 to 8 are removed and the pipe line 20D is connected to the pipe line 20C to connect the cooling pipe 201A and the cooling pipe 201G in parallel or the cooling pipe 201A and the cooling pipe 201H in parallel.

(7) The constitution for cooling the absorption solution by means of the heat exchanger 102 for cooling air and the pump 3 in the embodiment of FIG. 9 is supplemented with the constitution of the embodiment of FIG. 11.

(8) The cooling constitution of the first heat operation fluid 35a which comprises the air-cooled heat exchanger 66, the pump 67, the flow passage connection switch 47, the opening/closing valve V6 and the check valve 48 in FIG. 11 is supplemented with the constitution of the embodiment of FIG. 9.

(9) The location of the pipe line 10A for taking out the high-temperature refrigerant vapor 7c is changed to another appropriate location in the generator 5, e.g., at a location slightly below the lower end side of the reflux portion 205F.

(10) The pipe line connection switch 63C is constituted to carry out the same pipe line connection switch operation as a four-way valve by connecting a plurality of opening/closing valves.

Figure 12:
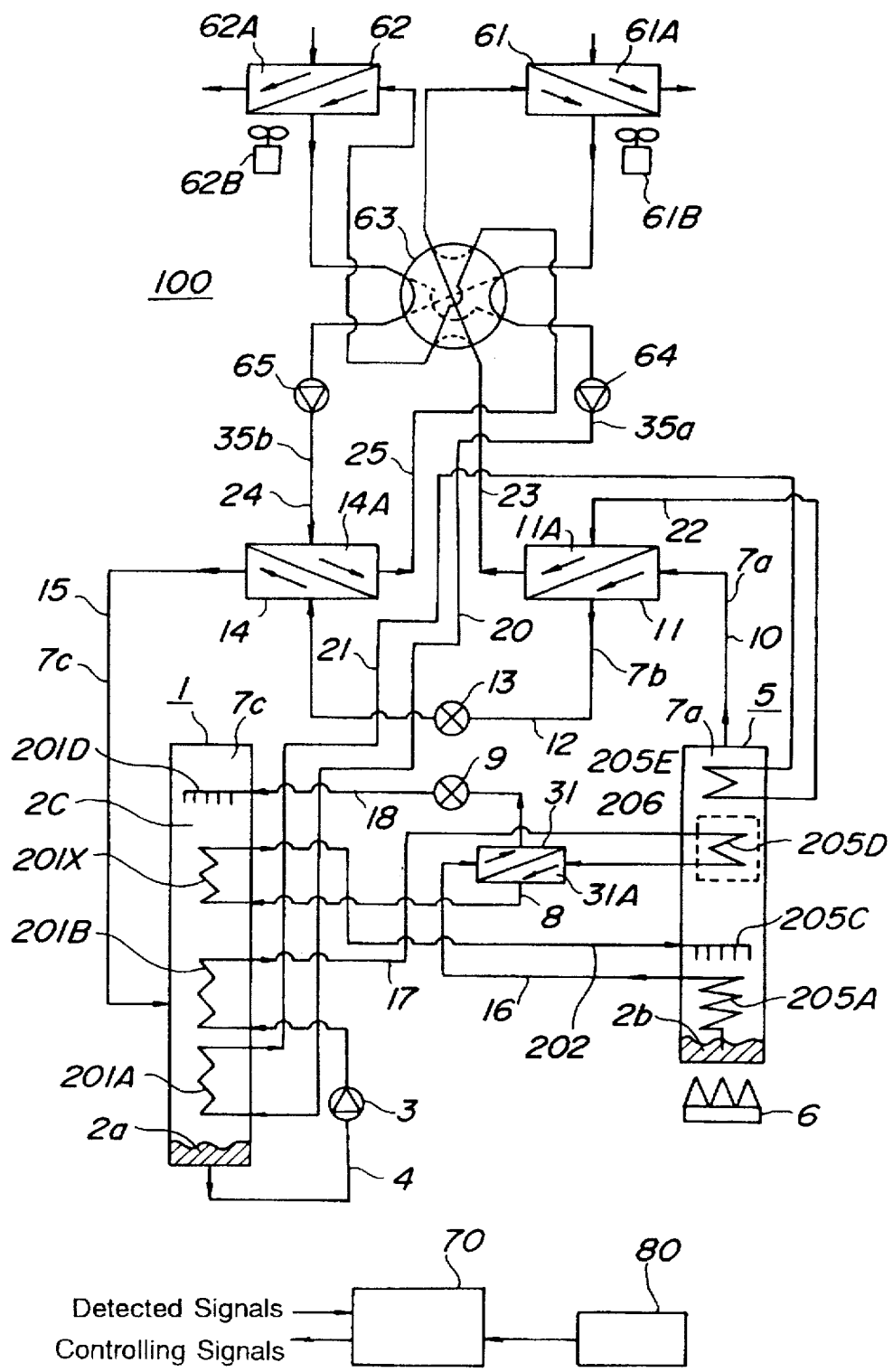
Figure 13:
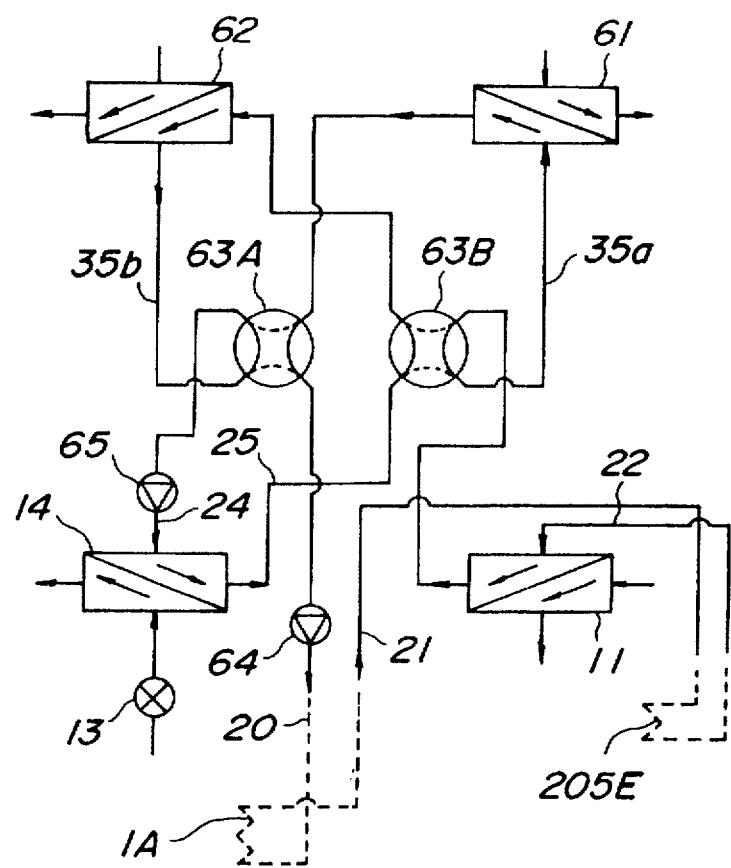

(11) A heat exchanger similar to the absorption solution heat exchanger 31 of the second prior art of FIG. 12 is arranged between the pipe line 16 and the pipe line 203.

As described on the foregoing pages, since a cooling function portion for cooling the absorption heat of the absorber 1 is divided into a plurality of sub-portions in the absorber 1, such as cooling pipes 201A and 201G, or a plurality of sub-portions arranged inside and outside the absorber 1, such as the cooling pipes 201A, 201G and the absorption/heat exchanger 234, even when the flow rate of the first heat operation fluid 35a, i.e., cooling water, or the amount cooled by the first heat operation fluid 35a in each one of cooling function sub-portions is reduced, a large cooling amount can be achieved as a whole. Therefore, the flow passages for cooling the condenser 11 and the absorber 1 by means of the first heat operation fluid 35a can be arranged in parallel or series to meet the cooling amount required by the condenser 11 and the cooling amount required by the absorber 1, or an arbitrary combination of these passages can be selected to achieve the optimal cooling efficiency. As a result, an apparatus capable of improving performance coefficient as an entire system can be provided.

Since the cooling pipe 201H arranged outside can be coiled around the outer shell 1A of the absorber 1 in such a manner that it is closely adhered to the outer shell 1A and the absorption/heat exchanger 234 can be formed into a suitable shape and installed in the remaining space left after the absorber 1 and the generator 5 have been installed, cooling efficiency can be increased with the size of the apparatus remaining the same as the prior art apparatus or possibly made smaller as required. As a result, a small-sized apparatus having an improved performance coefficient as an entire system can be provided.

Since the first heat operation fluid and the second heat operation fluid are joined together directly through an opening/closing valve during heating operation, a heat loss which is generated by heat inertia at the time of switching in the case of a flow passage connection switch having a large heat capacity and mechanical movement inertia such as an eight-way valve or four-way valve and a switching delay caused by movement inertia are eliminated. As a result, an apparatus having excellent heat efficiency and capable of quick switching can be provided.

Further, even when the heat capacity of the first heat operation fluid, i.e., cooling water, is increased to expand the capacity of cooling water from a viewpoint of efficiency during cooling operation, the connection switching of the flow passage of the first heat operation fluid can be formed of a simple opening/closing valve. In addition, a single heat exchanger for condensation/evaporation functions as a condensation heat exchanger and an evaporation heat exchanger for giving a heat source to the second operation fluid by reversing the circulation path of the refrigerant vapor. As a result, an apparatus which is much smaller in size than the prior art can be provided.

Since at the beginning of the start of heating operation or at the beginning of the start of heating operation after defrosting operation, the high-temperature refrigerant vapor in the generator is forcedly provided to the heat exchange function portion through the opening/closing valve, an apparatus free from such inconvenience that an unpleasant feeling caused by a delay in start-up time of heating is given to a human body can be provided.

What is claimed is:

1. An absorption type refrigerating apparatus for facilitating energy exchange for adjusting temperature in a desired heat operation object by means of a second heat operation fluid for heat exchange with an evaporation function portion while cooling an absorption function portion and a condensation function portion by means of a first heat operation fluid by providing an absorption solutions circulation system for circulating absorption solution through the absorption function portion for causing refrigerant vapor to be absorbed into an absorption solution and a refrigerant circulation system for circulating a refrigerant through a generation function portion for generating the refrigerant vapor from the absorption solution, the condensation function portion for obtaining a condensed refrigerant by condensing the generated refrigerant vapor, and the evaporation function portion for obtaining the refrigerant vapor by evaporating the condensed refrigerant, the apparatus comprising:

a plurality of absorption function means for dividing a cooling function portion for cooling the absorption function portion by means of the first heat operation fluid into a plurality of cooling function sub-portions; and cooling flow passage means for connecting the flow passages of the first heat operation fluid to the plurality of cooling function sub-portions, wherein said flow passages of the first heat operation fluid to the plurality of cooling function sub-portions are connected in series, and wherein a plurality of said cooling function sub-portions are a cooling function sub-portion arranged inside the absorption function portion and a cooling function sub-portion arranged outside the absorption function portion.

2. An absorption type refrigerating apparatus for facilitating energy exchange for adjusting temperature in a desired heat operation object by means of a second heat operation fluid for heat exchange with an evaporation function portion while cooling an absorption function portion and a condensation function portion by means of a first heat operation fluid by providing an absorption solutions circulation system for circulating absorption solution through the absorption function portion for causing refrigerant vapor to be absorbed into an absorption solution and a refrigerant circulation system for circulating a refrigerant through a generation function portion for generating the refrigerant vapor from the absorption solution, the condensation function portion for obtaining a condensed refrigerant by condensing the generated refrigerant vapor, and the evaporation function portion for obtaining the refrigerant vapor by evaporating the condensed refrigerant, the apparatus comprising:

a plurality of absorption function means for dividing a cooling function portion for cooling the absorption function portion by means of the first heat operation fluid into a plurality of cooling function sub-portions; and cooling flow passage means for connecting the flow passages of the first heat operation fluid to the plurality of cooling function sub-portions, wherein a plurality of said cooling function sub-portions are a plurality of cooling function sub-portions arranged inside the absorption function portion and a cooling function sub-portion arranged outside the absorption function portion, and the flow passages of the first heat operation fluid to the cooling function sub-portions arranged inside are connected in parallel and the flow passages of the first heat operation fluid to the cooling function sub-portions arranged outside are connected in series.

3. An absorption type refrigerating apparatus for facilitating energy exchange for adjusting temperature in a desired heat operation object by means of a second heat operation fluid for heat exchange with an evaporation function portion while cooling an absorption function portion and a condensation function portion by means of a first heat operation fluid by providing an absorption solutions circulation system for circulating absorption solution through the absorption function portion for causing refrigerant vapor to be absorbed into an absorption solution and a refrigerant circulation system for circulating a refrigerant through a generation function portion for generating the refrigerant vapor from the absorption solution, the condensation function portion for obtaining a condensed refrigerant by condensing the generated refrigerant vapor, and the evaporation function portion for obtaining the refrigerant vapor by evaporating the condensed refrigerant, the apparatus comprising:

a plurality of absorption function means for dividing a cooling function portion for cooling the absorption function portion by means of the first heat operation fluid into a plurality of cooling function sub-portions; and cooling flow passage means for connecting the flow passages of the first heat operation fluid to the plurality of cooling function sub-portions, wherein a plurality of said cooling function sub-portions are a cooling function sub-portion arranged inside the absorption function portion and a plurality of cooling function sub-portions arranged outside the absorption function portion, and the flow passages of the first heat operation fluid to the cooling function sub-portion arranged inside and one of the cooling function sub-portion arranged outside are connected in parallel and the flow passages of the first heat operation fluid to the other cooling function sub-portions arranged outside are connected in series.

* * * * *